(12) United States Patent
Wu

(10) Patent No.: US 10,132,990 B2
(45) Date of Patent: Nov. 20, 2018

(54) BACKLIGHT MODULE AND DISPLAY DEVICE

(71) Applicant: Boe Technology Group Co., Ltd., Beijing (CN)

(72) Inventor: Zhongbao Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 261 days.

(21) Appl. No.: 15/098,507

(22) Filed: Apr. 14, 2016

(65) Prior Publication Data

US 2016/0313500 A1 Oct. 27, 2016

(30) Foreign Application Priority Data

Apr. 27, 2015 (CN) .......................... 2015 1 0205430

(51) Int. Cl.
*F21V 8/00* (2006.01)
*G02F 1/1333* (2006.01)

(52) U.S. Cl.
CPC ..... *G02B 6/0088* (2013.01); *G02F 1/133308* (2013.01); *G02B 6/0093* (2013.01); *G02F 2001/133314* (2013.01)

(58) Field of Classification Search
CPC ................ G02B 6/0088; G02B 6/0093; G02F 1/133308; G02F 2001/133314
See application file for complete search history.

(56) References Cited

U.S. PATENT DOCUMENTS

2002/0196384 A1* 12/2002 Sakamoto ............ G02B 6/0021
  349/58
2014/0022485 A1* 1/2014 Kuo .................. G02F 1/133308
  349/58

FOREIGN PATENT DOCUMENTS

| CN | 102661526 | 9/2012 |
| CN | 102809132 | 12/2012 |
| CN | 203250090 | 10/2013 |
| CN | 203848112 U | 9/2014 |

OTHER PUBLICATIONS

Office Action from China Application No. 201510205430.1 dated Feb. 16, 2017.
Third Office Action for Chinese Patent Application No. 201510205430.1 dated Jul. 12, 2017.
Office action from Chinese Application No. 201510205430.1 dated Aug. 24, 2016.
Fourth Office Action for Chinese Patent Application No. 201510205430.1 dated Nov. 14, 2017.

* cited by examiner

*Primary Examiner* — Stephen F Husar
(74) *Attorney, Agent, or Firm* — Calfee, Halter & Griswold LLP

(57) ABSTRACT

A backlight module and a display device. The backlight module comprises a back plate, a light guide plate, and inwardly folded structures folded towards the light guide plate at the periphery of the back plate. At least an inwardly folded structure on a side of the back plate has a protruding step, and the light guide plate is arranged between the protruding step and a base surface of the back plate.

16 Claims, 8 Drawing Sheets

BACKLIGHT MODULE AND DISPLAY DEVICE

RELATED APPLICATIONS

The present application claims the benefit of Chinese Patent Application No. 201510205430.1, filed on Apr. 27, 2015, the entire disclosure of which is incorporated herein by reference.

FIELD OF THE INVENTION

The present invention relates to the field of display technology, particularly to a backlight module and a display device.

BACKGROUND OF THE INVENTION

For a liquid crystal backlight display device, the technologies such as ultra-narrow frame and frameless displays are becoming important design and area of development for backlight modules.

Conventional liquid crystal display modules substantially have a back plate that can bear optical components of the backlight source and a plastic frame that fixes the optical components and supports a panel. Hence, the frame thickness of the backlight module is roughly the material thickness of the back plate plus the material thickness of the plastic frame.

In the prior art, due to the limitation of the mold technology, the plastic frame has to have a considerable thickness, particularly in small and medium size liquid crystal display modules with light, thin, and ultra-narrow frames. The material thickness of the plastic frame is much larger than the material thickness of the back plate, such that the difficulty in reducing the thickness of the frame is relatively great.

SUMMARY OF THE INVENTION

In order to mitigate or solve the problem in small and medium size liquid crystal display modules with light, thin, and ultra-narrow frames in related art that the difficulty in reducing the thickness of the frame is increased due to the fact that the material thickness of the plastic frame is much larger than the material thickness of the back plate, the embodiments of the invention provide a backlight module and a display device.

According to a first aspect of the present invention, a backlight module is provided. The backlight module may comprise a back plate and a light guide plate. The back plate comprises inwardly folded structures folded towards the light guide plate at a periphery of the back plate, at least an inwardly folded structure on a side of the back plate has a protruding step, the light guide plate is arranged between the protruding step and a base surface of the back plate.

In a specific embodiment, each of the inwardly folded structures on two parallel or intersecting sides of the back plate may have two protruding steps, the protruding steps are respectively arranged at an edge of the side of the back plate where each inwardly folded structure locates.

In an embodiment, a first buffer structure may be arranged at an inner wall of the inwardly folded structure close to the light guide plate between the base surface of the back plate and the protruding step.

Further, a joint structure for fixing a display panel may be provided on a surface of the protruding step.

Further, the joint structure may comprise a double sided tape.

In another embodiment, a second buffer structure may be arranged at an inner wall of the inwardly folded structure located above the protruding step.

Further, the first buffer structure and/or the second buffer structure may comprise a silicone pad.

In an embodiment of the invention, a surface of the protruding step may be parallel to the base surface of the back plate.

According to a second aspect of the invention, a display device is provided, which may comprise a backlight module provided by any of the above embodiments.

Further, the display device may comprise an optical film, which may be arranged on a surface of the light guide plate.

Further, the display device can comprise a display panel, which may be arranged above the protruding step.

The inwardly folded structures arranged at the periphery of the back plate and folded towards the light guide plate can replace the plastic frame in the conventional backlight module, which helps to solving the problem in small and medium size liquid crystal display modules with light, thin, and ultra-narrow frames in related art that the difficulty in reducing the thickness of the frame is relatively great due to the fact that the material thickness of the plastic frame is much larger than the material thickness of the back plate; and it is favorable for realizing the characteristics such as ultra-narrow frame, ultra-lightness of the backlight module, and can reduce the cost of the backlight module.

It should be understood that the above general description and the following detailed description are only exemplary and explanatory, which cannot limit the present invention.

BRIEF DESCRIPTION OF THE DRAWINGS

The drawings herein are incorporated into the description and constitute part of the description, which show embodiments that conform to the present invention and cooperate with the description for explaining the principles of the present invention.

Figure 1:
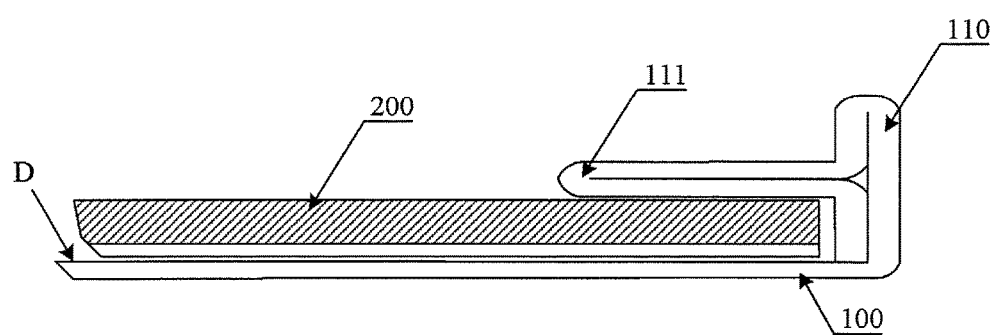
FIG. 1 is a structural schematic view of a backlight module according to an exemplary embodiment.

The drawings have shown explicit embodiments of the invention, which will be described in more detail subsequently. These drawings and literal descriptions intend to explain the concept of the invention for the skilled person in the art by making reference to particular embodiments, rather than limiting the scope of the design of the invention by any means.

DETAILED DESCRIPTION OF THE INVENTION

Here the exemplary embodiments will be explained in detail. The examples thereof are represented in the drawings. When the drawings are involved in the following description, unless otherwise indicated, the same reference number in different drawings represents the same or similar element. The implementations described in the following exemplary embodiments do not represent all implementations consistent with the present invention. On the contrary, they are only examples of device and method consistent with some aspects of the present invention as expounded in the attached claims.

FIG. 1 is a structural schematic view of a backlight module according to an exemplary embodiment. The backlight module can comprise a back plate 100 and a light guide plate 200. The back plate 100 may comprise inwardly folded structures 110 folded towards the light guide plate 200 at the periphery of the back plate 100, at least an inwardly folded structure 110 on a side of the back plate may have a protruding step 111, the light guide plate 200 is arranged between the protruding step 111 and a base surface D of the back plate 100.

For the backlight module provided by the embodiment of the invention, the inwardly folded structures arranged at the periphery of the back plate and folded towards the light guide plate can replace the plastic frame in the conventional backlight module, which helps to solve the problem in small- and medium-sized liquid crystal display modules with light, thin, and ultra-narrow frames in related art that the difficulty in reducing the thickness of the frame is relatively high due to the fact that the material thickness of the plastic frame is much larger than the material thickness of the back plate. Therefore, it is advantageous for realizing the characteristics such as ultra-narrow frame, ultra-lightness of the backlight module, and the cost of the backlight module may be reduced.

Figure 2:
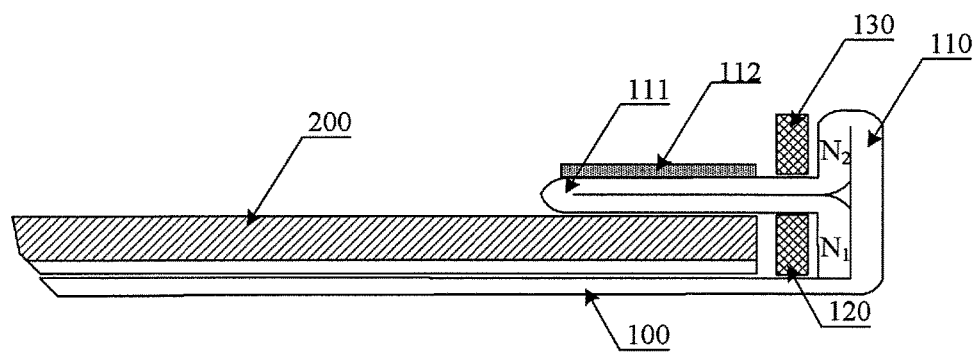
FIG. 2 is a structural schematic view of a backlight module provided according to another exemplary embodiment.

Further, referring to FIG. 2, a structural schematic view of a backlight module is provided. The backlight module adds additional components on the basis of the backlight module as shown in FIG. 1, thereby enabling the backlight module provided by this embodiment to have better performance.

In some embodiments, a first buffer structure 120 can be arranged at an inner wall $N_1$ of the inwardly folded structure 110 close to the light guide plate 200 between the base surface of the back plate 100 for bearing the whole backlight module and the protruding step 111. The first buffer structure 120 may be a silicone pad that can cooperate with the inwardly folded structure 110 and the protruding step 111 to limit the light guide plate 200.

In some embodiments, a joint structure 112 for fixing a display panel can be provided on a surface of the protruding step 111. The joint structure 112 can be a double sided tape, which can fix the display panel (not shown in FIG. 2) on the protruding step 111.

In this embodiment, a second buffer structure 130 can be arranged at an inner wall $N_2$ of the inwardly folded structure 110 located above (i.e. in a direction of one of the two sides of the protruding step 111 away from the light guide plate 200) the protruding step 111. The second buffer structure 130 can be a silicone pad, which can cooperate with the inwardly folded structure 110 to limit the display panel.

Figure 3:
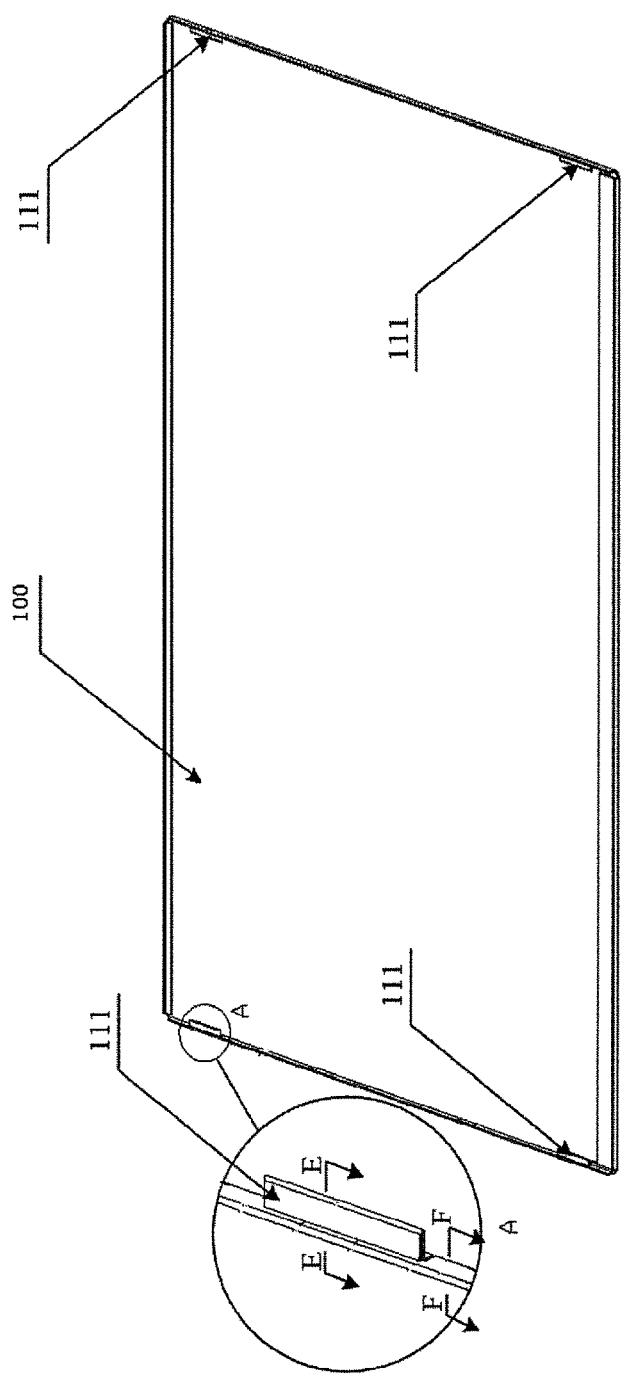
FIG. 3 is a schematic view of an overall structure of a back plate in the backlight module shown in FIG. 2.
Figure 4:
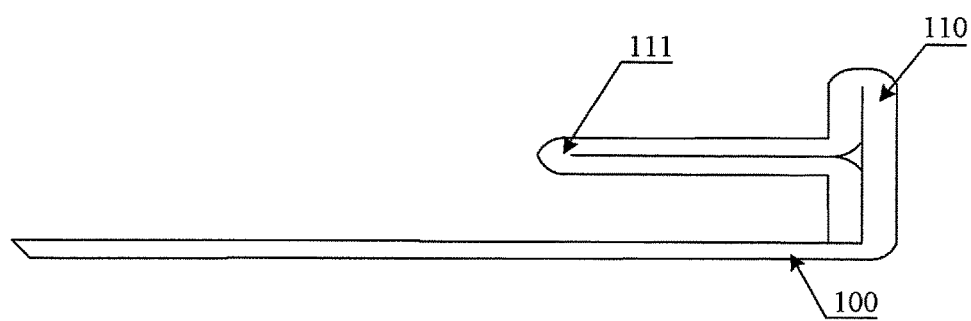
FIG. 4 is a schematic partial section view of a back plate in the backlight module shown in FIG. 3 where the inwardly folded structure is formed with a protruding step.
Figure 5:
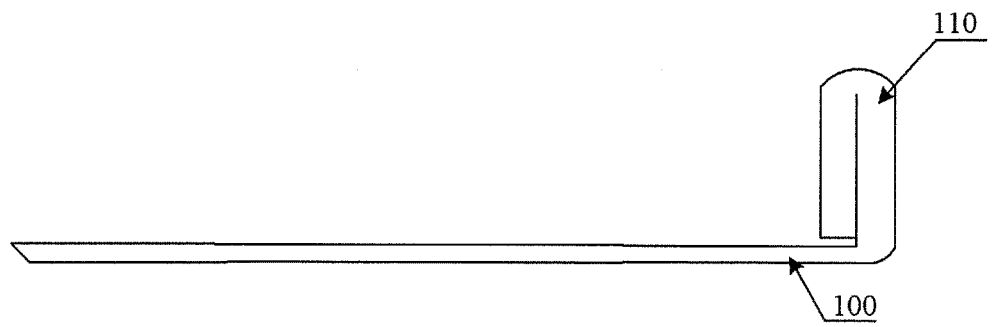
FIG. 5 is a schematic partial section view of a back plate in the backlight module shown in FIG. 3 where the inwardly folded structure is not formed with a protruding step.
Figure 6:
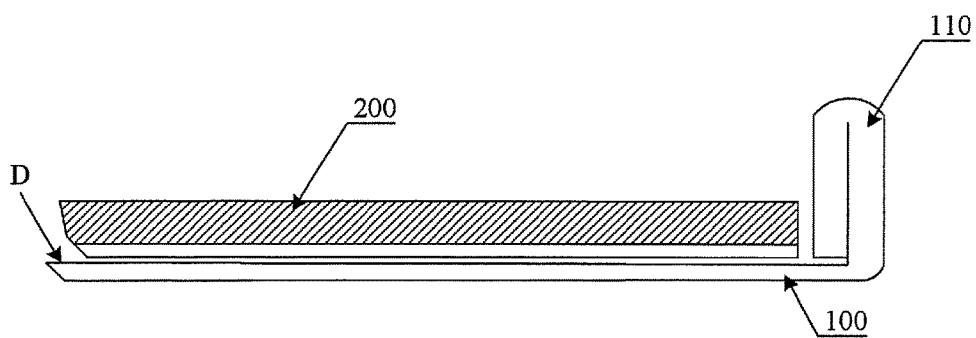
FIG. 6 is a schematic partial section view of a backlight module shown in FIG. 2 where the inwardly folded structure is not formed with a protruding step.

In some embodiments, it is possible that only some of the inwardly folded structures 110 are provided with the protruding step 111. In some embodiments, each of the inwardly folded structures 110 located on two parallel or intersecting sides of the back plate can be provided with two protruding steps 111. The protruding steps 111 may be respectively arranged at an edge of the side of the back plate where each inwardly folded structure 110 locates. As shown in FIG. 3, an overall structure of the back plate 100 and an amplified schematic view of an area A is illustrated. Two parallel sides of the back plate 100 are provided with protruding steps 111 respectively. The sectional view at E as shown in FIG. 3 can be as shown in FIG. 4, i.e., FIG. 4 shows a schematic partial section view of the back plate 100 where the inwardly folded structure 110 is formed with a protruding step 111. The sectional view at F as shown in FIG. 3 can be as shown in FIG. 5, i.e., FIG. 5 shows a schematic partial section view of the back plate 100 where the inwardly folded structure 110 is not formed with a protruding step 111. Similarly, as shown in FIG. 6, a schematic partial section view of the backlight module where the inwardly folded structure 110 is not formed with a protruding step 111 is illustrated. The light guide plate 200 is arranged on the base surface D of the back plate 100.

For the backlight module provided by the embodiment of the invention, the inwardly folded structures arranged at the periphery of the back plate and folded towards the light guide plate can replace the plastic frame, which helps to solve the problem in small and medium size liquid crystal display modules with light, thin, and ultra-narrow frames in related art that the difficulty in reducing the thickness of the frame is relatively high due to the fact that the material thickness of the plastic frame is much larger than the material thickness of the back plate. Therefore, it is advantageous for realizing the characteristics such as ultra-narrow frame, ultra-lightness of the backlight module, and the cost of the backlight module may be reduced.

Figure 7:
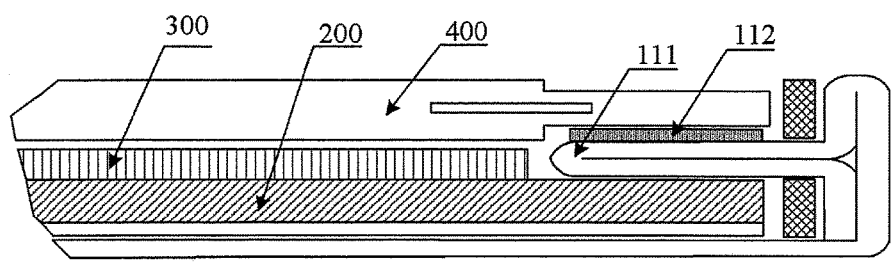
FIG. 7 is a structural schematic view of a display device according to an exemplary embodiment.

FIG. 7 is a structural schematic view of a display device according to an exemplary embodiment. The display device can comprise a backlight module provided by the embodiment as shown in FIG. 2.

Figure 8:
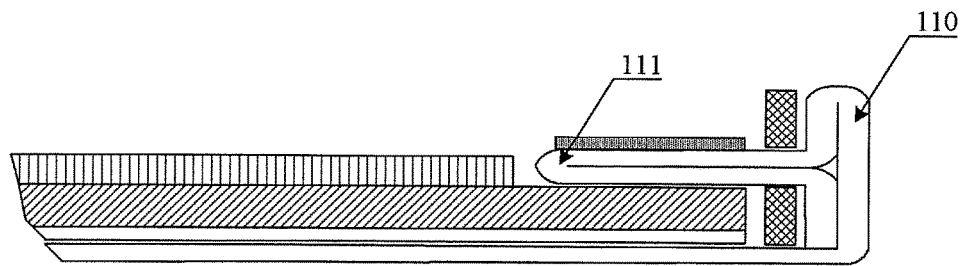
FIG. 8 is a schematic partial section view of the display device shown in FIG. 7 where the inwardly folded structure is formed with a protruding step.
Figure 9:
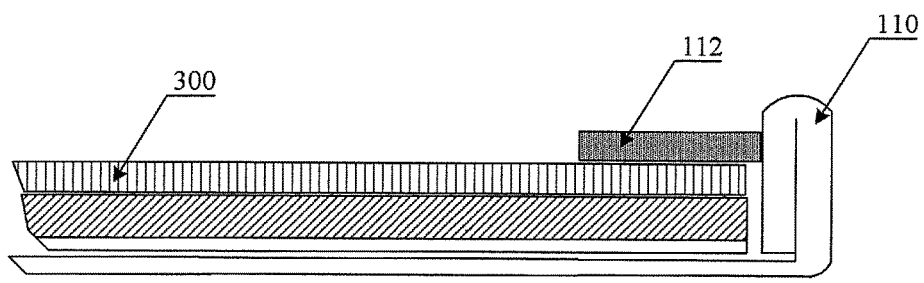
FIG. 9 is a schematic partial section view of the display device shown in FIG. 7 where the inwardly folded structure is not formed with a protruding step.
Figure 10:
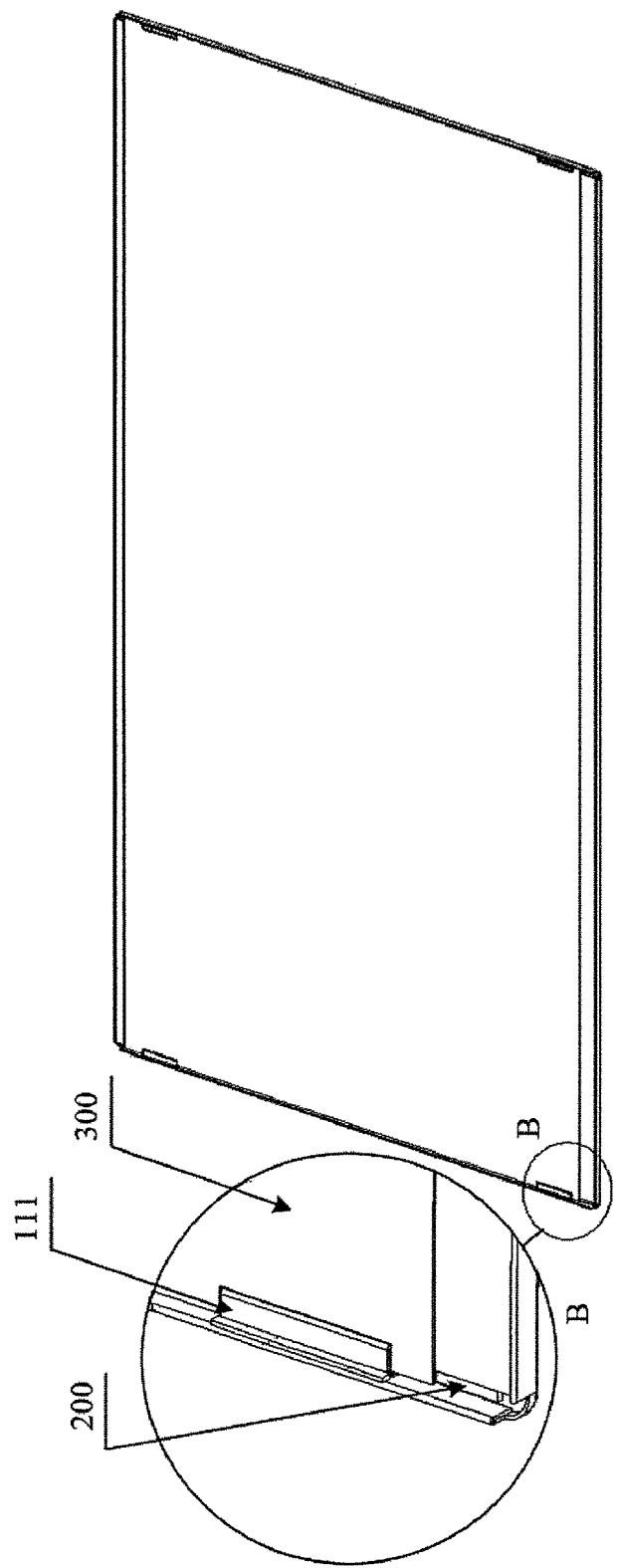
FIG. 10 is a schematic view of an overall structure of the display device shown in FIG. 7.

Further, the display device may comprise an optical film 300 which can be arranged on a surface of the light guide plate 200. As shown in FIG. 8, a schematic partial section view of the display device is provided, wherein the inwardly folded structure 110 is formed with a protruding step 111. Similarly, as shown in FIG. 9, a schematic partial section view of the display device is provided, wherein the inwardly folded structure 110 is not formed with a protruding step 111. Joint structure 112 may be directly arranged on a surface of the optical film 300. Also, as shown in FIG. 10, an overall structure of the display device is provided, further with an amplified schematic view of an area B, in which the optical film 300 is arranged on a surface of the light guide plate 200, protruding steps 111 may be arranged at four corners of the display device.

Figure 11:
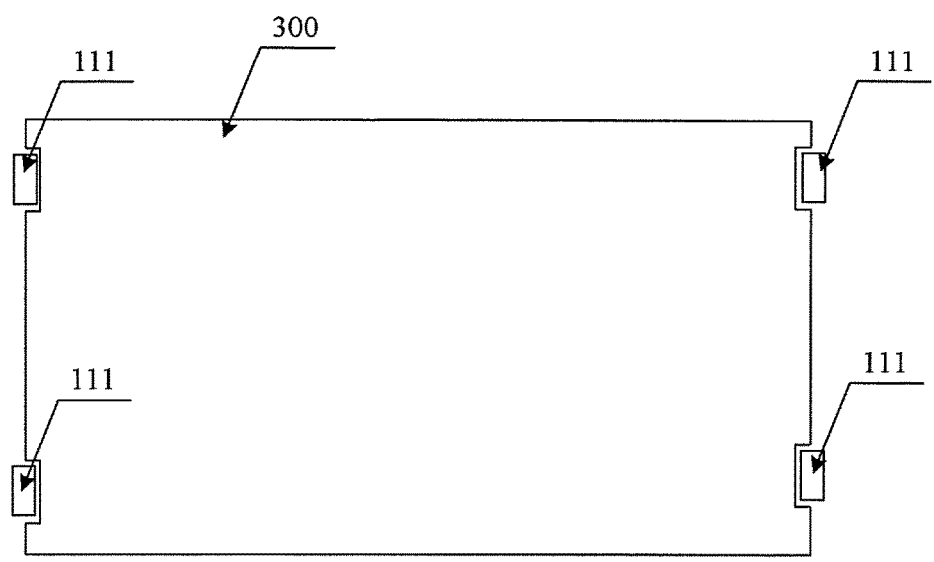
FIG. 11 is a top view of an optical film in the display device shown in FIG. 10.

Additionally or alternatively, as shown in FIG. 11, a schematic top view of the optical film 300 in the display device is provided. As shown in FIG. 10, the optical film 300 can be provided with a gap (not shown in FIG. 11) in a shape similar with the protruding step 111. Hence, when the optical film 300 is mounted for the display device, it can be limited by means of the protruding steps 111.

As shown in FIG. 7, the display device may further comprise a display panel 400, the display panel 400 may be arranged above the protruding step 111 and be jointly fixed with the joint structure 112.

Figure 12:
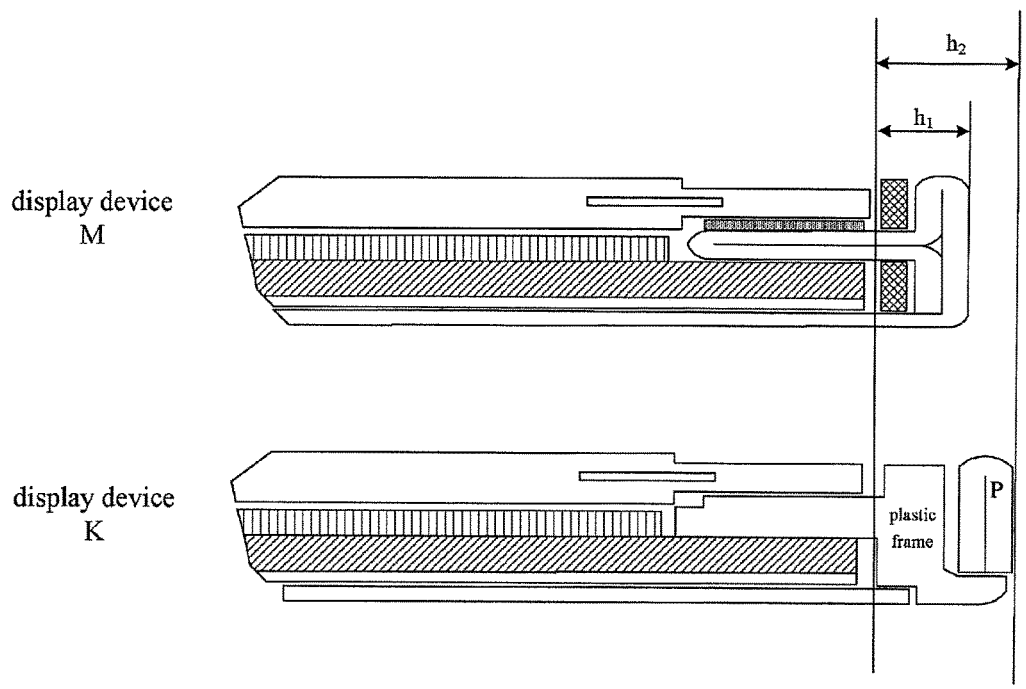
FIG. 12 is a schematic view of comparison between the display device shown in FIG. 7 and a display device in the prior art.

As shown in FIG. 12, a schematic view of comparison between the display device M is provided. The display device K in the prior art can be seen from FIG. 12 in that the frame thickness $h_1$ of the display device M provided by the illustrated embodiment is apparently smaller than the frame thickness $h_2$ of the display device K in the prior art (the frame thickness $h_2$ at least includes the width of the plastic frame and the width of component P for fixing the plastic frame). Therefore, the display device provided by the embodiment of the invention can reduce the frame thickness of the display device, moreover, since it does not need to use the plastic frame, the weight and manufacture cost of the display device may also reduced.

To sum up, the display device provided by the embodiment of the invention, by replacing the plastic frame with the inwardly folded structures arranged at the periphery of the back plate and folded towards the light guide plate, helps to solving the problem in small and medium size liquid crystal display modules with light, thin, and ultra-narrow frames in related art that the difficulty in reducing the thickness of the frame is relatively great due to the fact that the material thickness of the plastic frame is much larger than the material thickness of the back plate; and it is favorable for realizing the characteristics such as ultra-narrow frame, ultra-lightness of the backlight module, and can reduce the cost of the backlight module.

The above disclosure merely includes exemplary embodiments, which are not used for limiting the invention. Any modification, equivalent replacement, and improvement and the like made within the spirit and the principle of the invention should be covered within the protection scope of the invention.

The invention claimed is:

1. A backlight module, comprising:
    a back plate; and
    a light guide plate;
    wherein the back plate comprises inwardly folded structures folded towards the light guide plate at a periphery of the back plate, wherein at least an inwardly folded structure on a side of the back plate has a protruding step, and wherein the light guide plate is arranged between the protruding step and a base surface of the back plate,
    wherein a joint structure for fixing a display panel is provided on a surface of the protruding step.

2. The backlight module according to claim 1, wherein each of the inwardly folded structures on two parallel or intersecting sides of the back plate has two protruding steps, and wherein the protruding steps are respectively arranged at an edge of the side of the back plate where each inwardly folded structure locates.

3. The backlight module according to claim 1, wherein a first buffer structure is arranged at an inner wall of the inwardly folded structure close to the light guide plate between the base surface of the back plate and the protruding step.

4. The backlight module according to claim 1, wherein the joint structure comprises a double sided tape.

5. The backlight module according to claim 3, wherein a second buffer structure is arranged at an inner wall of the inwardly folded structure located above the protruding step.

6. The backlight module according to claim 5, wherein at least one of the first buffer structure and the second buffer structure comprises a silicone pad.

7. The backlight module according to claim 1, wherein a surface of the protruding step is parallel to the base surface of the back plate.

8. A display device comprising a backlight module, the backlight module, comprising:
    a back plate; and
    a light guide plate;
    wherein the back plate comprises inwardly folded structures folded towards the light guide plate at a periphery of the back plate, wherein at least an inwardly folded structure on a side of the back plate has a protruding step, and wherein the light guide plate is arranged between the protruding step and a base surface of the back plate,
    wherein a joint structure for fixing a display panel is provided on a surface of the protruding step.

9. The display device according to claim 8, wherein each of the inwardly folded structures on two parallel or intersecting sides of the back plate has two protruding steps, and wherein the protruding steps are respectively arranged at an edge of the side of the back plate where each inwardly folded structure locates.

10. The display device according to claim 8, wherein a first buffer structure is arranged at an inner wall of the inwardly folded structure close to the light guide plate between the base surface of the back plate and the protruding step.

11. The display device according to claim 8, wherein the joint structure comprises a double sided tape.

12. The display device according to claim 10, wherein a second buffer structure is arranged at an inner wall of the inwardly folded structure located above the protruding step.

13. The display device according to claim 12, wherein at least one of the first buffer structure and the second buffer structure comprises a silicone pad.

14. The display device according to claim 8, wherein a surface of the protruding step is parallel to the base surface of the back plate.

15. The display device according to claim 8, wherein the display device comprises an optical film, wherein the optical film is arranged on a surface of the light guide plate.

16. The display device according to claim 8, wherein the display device comprises a display panel, wherein the display panel is arranged above the protruding step.

* * * * *